United States Patent [19]

Oota et al.

[11] 4,431,906

[45] Feb. 14, 1984

[54] ELECTRIC RICE COOKER

[75] Inventors: Hiroyuki Oota, Iwakura; Terutaka Aoshima, Toyohashi; Ryuho Narita; Kenji Yamamori, both of Nagoya, all of Japan

[73] Assignee: Tokyo Shibaura Denki Kabushiki Kaisha, Kawsaki, Japan

[21] Appl. No.: 449,641

[22] Filed: Dec. 14, 1982

[30] Foreign Application Priority Data

Dec. 18, 1981 [JP]  Japan ................ 56-205544

[51] Int. Cl.$^3$ ............................................. F27D 11/02
[52] U.S. Cl. ...................... 219/441; 99/333; 219/435; 219/492; 219/494
[58] Field of Search ............... 219/385, 386, 429, 430, 219/433, 435, 438, 439, 441, 442, 492, 493, 494, 509, 510; 99/285, 331, 332, 333, 335

[56] References Cited

U.S. PATENT DOCUMENTS

| | | | |
|---|---|---|---|
| 4,234,783 | 11/1980 | Aoshima | 219/441 |
| 4,241,288 | 12/1980 | Aoshima et al. | 219/441 |
| 4,313,051 | 1/1982 | Aoshima | 219/441 |
| 4,315,138 | 2/1982 | Miwa | 219/441 |
| 4,315,139 | 2/1982 | Onishi et al. | 219/441 |
| 4,362,923 | 12/1982 | Aoshima | 219/441 |

FOREIGN PATENT DOCUMENTS

| | | |
|---|---|---|
| 53-63174 | 6/1978 | Japan . |
| 56-91527 | 12/1979 | Japan . |
| 1545918 | 5/1979 | United Kingdom . |

*Primary Examiner*—Volodymyr Y. Mayewsky
*Attorney, Agent, or Firm*—Cushman, Darby & Cushman

[57] ABSTRACT

An electric rice cooker is disclosed which includes a cooking kettle for containing rice and water, a removable lid member covering the top of the kettle, a heater provided adjacent to the outer bottom surface of the kettle to heat the kettle, and a thermistor for measuring the actual kettle temperature. A cooking amount measuring circuit for detecting the actual amount of kettle contents every time a cooking operation is performed, and a control circuit for controlling the operation of the heater by determining the proper time at which the heater should be turned OFF in accordance with actually measured data obtained during the cooking operation which is being performed, are arranged in a case.

14 Claims, 3 Drawing Figures

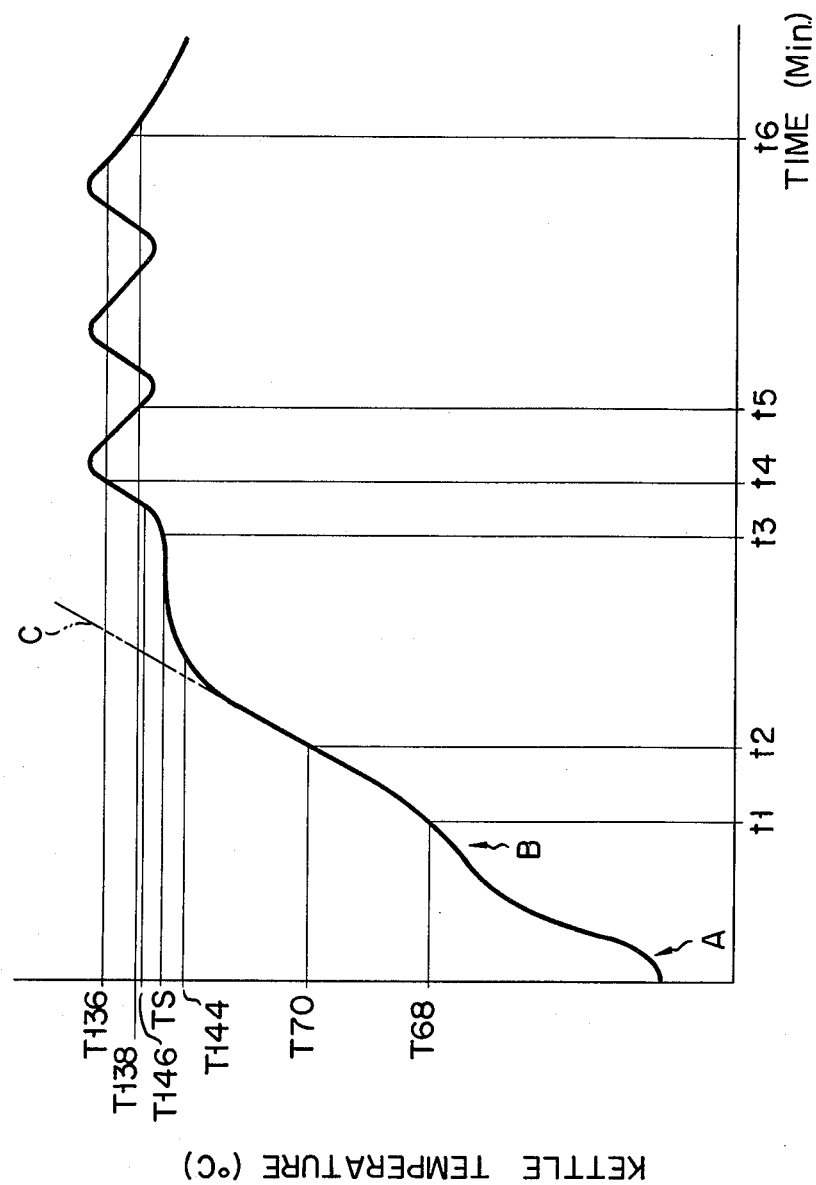

ELECTRIC RICE COOKER

BACKGROUND OF THE INVENTION

The present invention relates to an electric rice cooker and, more particularly, to an electric rice cooker which automatically controls the proper end time of heating for cooking in accordance with the actual temperature inside a cooking pot or kettle containing rice and water.

A conventional electric rice cooker has a magnetic shunt steel member mounted at the outer bottom surface of the cooking pot or kettle and a permanent magnet attracted and held to the magnetic shunt member against an urging force of an elastic member such as a coil spring. The temperature of the cooking kettle heated by an electrical heater can be constantly detected by the magnetic shunt steel member as cooking progresses. When the detected kettle temperature reaches a predetermined "cooking complete" temperature or "cooked" temperature, the permeability of the magnetic shunt steel member is abruptly decreased. The attraction force between the permanent magnet and the magnetic shunt steel member then becomes smaller than the urging force of the coil spring. As a result, the permanent magnet is detached from the magnetic shunt steel member by the urging force of the spring. Upon this movement of the permanent magnet, the cooking heater is deenergized, thereby completing the cooking operation of the electric rice cooker. Thus, deenergization of the cooking heater is performed by mechanical action of the permanent magnet.

In the conventional electric rice cooker having the switching mechanism described above, the time at which the cooking heater goes OFF, that is, the proper cooking end time, cannot be uniformly set for all mass-produced electric rice cookers, due to variations in various characteristics of the magnetic shunt steel member, the permanent magnet and the coil spring, as well as in the attraction state between the magnetic shunt member and the bottom of the cooking kettle. Therefore, the precision of the "OFF" time is undesirably arbitrary for each individual rice cooker. Individual mass-produced rice cookers may have such a delayed heater "OFF" time that the cooked rice actually burns. On the other hand, another rice cooker may have a premature "OFF" time, so that the necessary conversion of beta-starch into alpha-starch cannot be completed. As a result, in either case, good-tasting cooked rice cannot be obtained.

SUMMARY OF THE INVENTION

It is, therefore, an object of the present invention to provide an electric rice cooker which automatically and properly controls the energization time of the cooking heater for cooking rice together with water in a cooking kettle, thereby cooking desirable, good-tasting rice.

The electric rice cooker according to the present invention comprises a kettle or pot for containing rice and water, an electric heater for heating the kettle, a thermal insulating frame which supports and encloses the kettle and the heater, a kettle temperature measuring device, a cooking amount measuring device, and a control device. The kettle temperature measuring device measures the actual kettle temperature and produces a first electrical signal corresponding to the actual kettle temperature. The cooking amount measuring device electrically detects the actual amount of rice and water (or total kettle contents) contained in the kettle each time cooking is performed. The cooking amount measuring device produces a second electrical signal in accordance with the detected amount of the kettle contents. A control device is connected to the temperature measuring device and the cooking amount measuring device. In response to the second electrical signal, the control device determines a reference temperature corresponding to the proper "cooking complete" temperature in accordance with the detected amount of kettle contents and the cooking conditions. When the actual kettle temperature, which is indicated by the first electrical signal and is increased upon heating by the cooking heater, reaches the reference temperature, the control device prevents further power supply to the cooking heater, thereby deenergizing the cooking heater.

BRIEF DESCRIPTION OF THE DRAWINGS

The present invention is best understood by reference to the accompanying drawings, in which:

FIG. 3 is a graph for explaining the change in kettle temperature (°C.) of the cooking pot or kettle in the electric rice cooker of FIG. 1 as a function of time (min).

DETAILED DESCRIPTION OF THE PREFERRED EMBODIMENT

Figure 1:
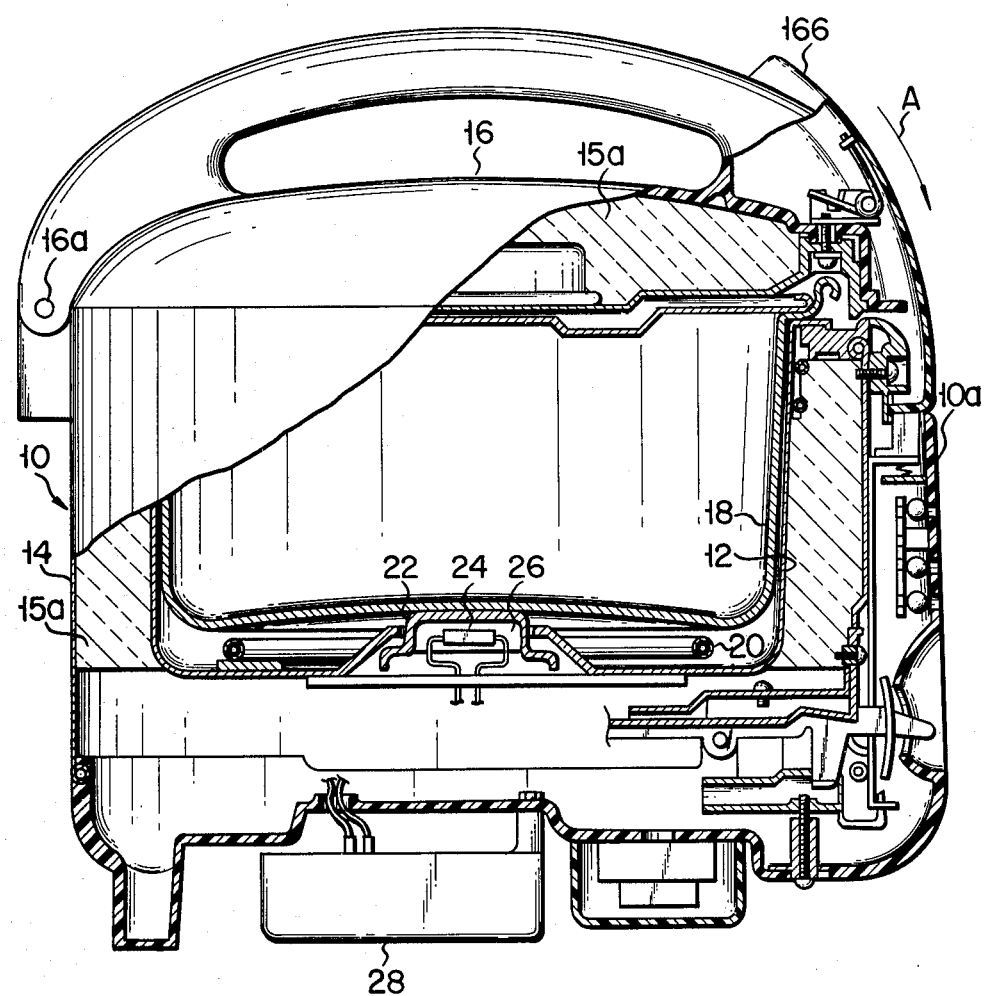
FIG. 1 is a side view schematically showing a section of the main part of an electric rice cooker according to an embodiment of the present invention.

Referring now to FIG. 1, an electric rice cooker in accordance with an embodiment of the present invention is illustrated. In FIG. 1, a main body 10 of the rice cooker includes an inner case 12 and an outer case 14. A thermal insulating material 15a is sandwiched between the inner and outer cases 12 and 14. A lid member 16 has a thermal insulating material 15b therein. The lid member 16 is mounted at an upper opening (not shown) of the main body to be pivotable or movable in the direction indicated by arrow A about a hinge shaft 16a and also in the direction opposite to the arrow A. When the lid member 16 is tightly closed, an engaging member 16b which is disposed opposing the hinge shaft 16a of the lid member 16 engages an engaging member 10a of the main body 10, thereby tightly closing the main body 10. The internal space of the main body is thus thermally insulated from the outer atmosphere.

A pot or kettle 18 which contains rice (not shown) to be cooked and a proper amount of water (not shown) is placed inside the inner case 12 of the main body 10. A cooking heater 20, for heating the kettle 18 detachably placed in the inner case 12, is provided at the inner bottom portion of the inner case 12. When the kettle 18 containing rice and water is placed in the main body 10, the cooking heater 20 is adjacent to the outer surface of the kettle 18 and directly heats the rice and water contained in the kettle 18.

A cup-shaped heat sensor 22 is disposed substantially at the center of the inner bottom surface of the inner case 12 so as to be brought into tight and elastic contact with the outer bottom surface of the kettle 18 placed in the inner case 12. The heat sensor 22 has a thermistor 24 which serves as a temperature sensor therein. The thermistor 24 is stably encapsulated within a molded member 26 which comprises a good heat-conductive material. The temperature of the kettle 18 is detected by the heat sensor 22. At this time, the thermistor 24 changes its resistance in accordance with the detected temperature. A case 28 is disposed at the outer bottom portion of the outer case 14 of the main body 10 of the rice cooker and has a cooking control section. The mechanical construction of the electric rice cooker of this type is known and fully described in U.S. Pat. No. 4,315,138 of Miwa or U.S. Pat. No. 4,315,139 of Ohnishi et al. Therefore, the disclosure is hereby incorporated by reference.

Figure 2:
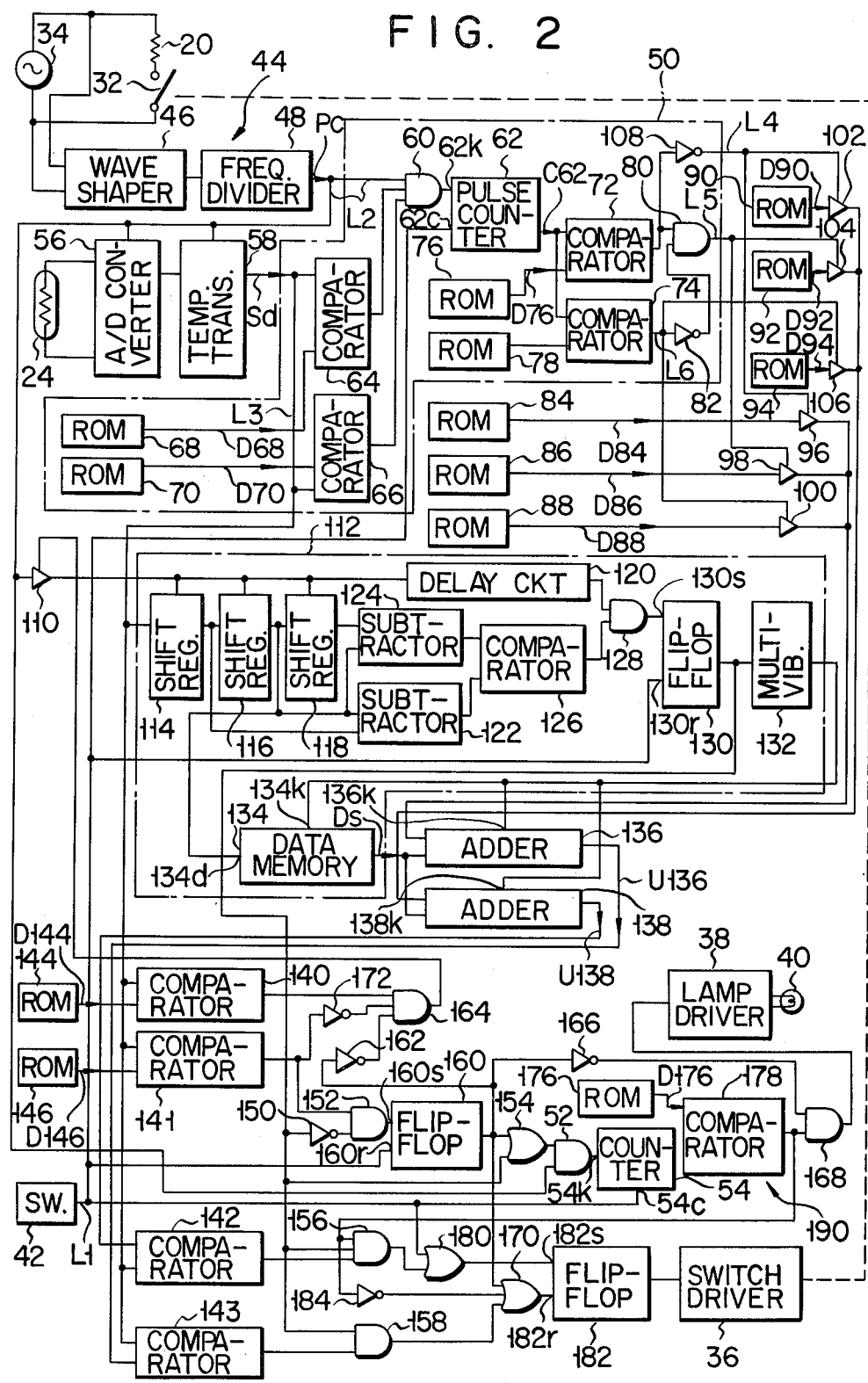
FIG. 2 is a circuit diagram showing the overall configuration of the electric rice cooker of FIG. 1.

FIG. 2 shows the cooking control circuit arranged in the case 28 in detail. The cooking heater 20 is electrically connected to an AC power source 34 through a normally-open switch or a cooking heater switch 32 via a known plug/receptacle assembly (not shown). The cooking heater switch 32 is controlled by a switch driver 36 which is ON in response to a logic level "1" signal. Reference numeral 38 denotes a lamp driver for driving an indicator lamp 40 which indicates the cooking mode in response to a logic level "1" signal. A cooking start/stop switch 42 (to be referred to as a cooking switch 42 hereinafter) is manually operated by the operator or user. When the operator presses the cooking switch 42, the cooking switch 42 produces a logic level "1" signal which is then supplied to a line L1.

The two terminals of the AC power source 34 are connected to a wave shaper 46 which shapes the waveform of the output from the AC power source 34 and which is incorporated in a pulse generator 44. The pulse generator 44 also includes a frequency divider 48 connected to the wave shaper 46 to frequency-divide the output therefrom. The frequency divider 48 is arranged to produce a clock pulse signal Pc of 1 Hz frequency, for example, according to a known manner, which is then supplied to a line L2. The clock pulse signal Pc is supplied to a cooking amount measuring section 50 and to a pulse counter 54 which counts pulses received at a clock input terminal 54$k$ thereof through an AND network or AND gate 52. When the pulse counter 54 receives a logic level "1" signal at its clear terminal 54$c$, the count data is cleared. The clock pulse signal Pc is also supplied to an A/D converter 56 connected to the thermistor 24 in FIG. 1, and to a temperature transducer 58 connected to the A/D converter 56. Every time the A/D converter 56 receives a change in resistance having an analog value as an input signal from the thermistor 24 and receives the clock pulse signal Pc from the pulse generator 44 through the line L2, it converts the analog resistance to a digital resistance. The temperature transducer 58 receives a digital output signal from the A/D converter 56 and transduces it to a digital temperature value. The temperature transducer 58 then supplies a digitized temperature detection signal Sd to a line L3 corresponding to the actual kettle temperature Td detected by the thermistor 24.

The cooking amount measuring section 50 includes a 3-input AND gate 60 which receives the clock pulse signal Pc at its first input terminal, and a pulse counter 62 connected to the output terminal of the AND gate 60. The pulse counter 62 has the same arrangement as the pulse counter 54. A clear terminal 62$c$ of the pulse counter 62 is connected to the cooking switch 42. The second and third input terminals of the 3-input AND gate 60 are respectively connected to the output terminals of comparators 64 and 66 of a known configuration. One input terminal of each of the comparators 64 and 66 receives the digitized temperature detection signal Sd. Data memories 68 and 70, which are both comprised of ROMs, for example, store therein temperature data D68 and D70, respectively indicating preset measuring temperatures T68 and T70 (where $T68<T70<$a lower limit kettle temperature T144 to be defined later) used for measuring the cooking amount. The comparator 64 receives and compares the temperature detection signal Sd and the temperature data D68 from the data memory 68. When the level (actual kettle temperature Td) of the temperature detection signal Sd is higher than the level (temperature T68) of the temperature data D68, the comparator 64 produces a logic level "1" signal. Otherwise, it produces a logic level "0" signal. The comparator 66 receives and compares the temperature detection signal Sd and the temperature data D70 from the data memory 70. When the level or temperature T70 of the temperature data T70 is higher than the temperature detection signal Sd indicating the temperature Td, the comparator 66 produces a logic level "1" signal. Otherwise, it produces a logic level "0" signal.

The cooking amount measuring section 50 includes two comparators 72 and 74. One input terminal of each of the comparators 72 and 74 is connected to the output terminal of the pulse counter 62. The other input terminals of the comparators 72 and 74 are respectively connected to the output terminals of data memories 76 and 78 comprised of ROMs, for example. The data memories 76 and 78 store preset measuring time data D76 and preset measuring time data D78, respectively indicating preset time windows t76 and t78 (where $t76<t78$) for measuring the cooking amount. The comparators 72 and 74 receive a counter signal C62 from the pulse counter 62. The counter signal C62 is compared with the time data D76 and the time data D78 by the comparators 72 and 74. When the level of the counter signal C62 is higher than the levels of the time data D76 and the time data D78, the comparators 72 and 74 both produce logic level "1" signals. Otherwise, they produce logic level "0" signals. The output terminal of the comparator 72 is directly connected to one input terminal of an AND gate 80, and the output terminal of the comparator 74 is connected to the other input terminal of the AND gate 80 through an inverter 82.

Six data memories 84, 86, 88, 90, 92 and 94 are connected to six transfer gates 96, 98, 100, 102, 104 and 106, respectively. The data memories 84, 86 and 88 store temperature data D84, D86 and D88, respectively. The temperature data D84, D86 and D88 respectively indicate predetermined temperatures T84, T86 and T88 (°C., where $T84<T86<T88$). The data memories 90, 92 and 94 store temperature data D90, D92 and D94 which respectively indicate predetermined second cooking temperatures T90, T92 and T94 (°C., where $T90<T92<T94$, $T90<T84$, $T92<T86$, and $T94<T88$). The so-called "twice cooking" technique which is described in U.S. Pat. No. 4,234,783 and incorporated by reference herein, is well-known to those skilled in the art. The output terminal of the comparator 72 included in the cooking amount measuring section 50 is connected to the transfer gates 102 and 96 through an inverter 108 via a line L4. The output terminal of the AND gate 80 is connected to the transfer gates 98 and 104 via a line L5. The output terminal of the comparator 74 is connected to the transfer gates 100 and 106 via a line L6. Only when logic level "1" signals are supplied to the transfer gates 96 through 106, respectively, do these gates decrease their impedances to allow transmission of the input signals. The output terminals of the transfer gates 96, 98 and 100 are commonly connected, as are the output terminals of the transfer gates 102, 104 and 106.

The clock pulse signal Pc generated by the pulse generator 44 is supplied to a data processing section 112 through a transfer gate 110, while the digitized temperature detection signal Sd from the temperature transducer 58 is directly supplied to the data processing section 112. In the data processing section 112, three shift registers 114, 116 and 118 and a delay circuit 120 are arranged to receive the clock pulse signal Pc through the transfer gate 110. The shift registers 114, 116 and 118 are sequentially connected in series. The shift register 114 directly receives the temperature detection signal Sd. Every time one input terminal of each of the shift registers 114, 116 and 118 receives the clock pulse, an input signal supplied to the other input terminal of each of the shift registers 114, 116 and 118 is transferred to its output terminal and is output therefrom. The delay circuit 120 has a delay time longer than the time interval during which the signal Sd is supplied to the shift register 114 and is produced at the output terminal of the shift register 118. A 2-input subtractor 122 has two input terminals respectively connected to the output terminals of the shift registers 114 and 116. A 2-input subtractor 124 has two input terminals respectively connected to the output terminals of the shift registers 116 and 118. Each of the 2-input subtractors 122 and 124 receives two input signals and performs subtraction to produce a subtraction result. The 2-input subtractors 122 and 124 are connected to one input terminal of an AND gate 128 through a comparator 126. When the output from the subtractor 122 is greater than that from the subtractor 124, the comparator 126 produces a logic level "1" signal. Otherwise, the comparator 126 produces a logic level "0" signal. The delay circuit 120 is connected to the other input terminal of the AND gate 128. The output terminal of the AND gate 128 is connected to the set terminal 130s of an R-S flip-flop 130 having a reset terminal 130r connected to the cooking switch 42. The R-S flip-flop 130 is connected through a monostable multivibrator 132 to the clock input terminal 134k of a data memory 134 arranged in the data processing section 112. The data memory 134 has a data terminal 134d connected to the output terminal of the shift register 116. When the clock pulse is supplied to the clock input terminal 134k of the data memory 134, the data memory 134 stores data received at the data terminal 134d thereof.

An adder 136 is provided having a first signal input terminal connected to the commonly-connected output terminals of the transfer gates 96, 98 and 100, a second signal input terminal connected to the output terminal of the data memory 134, and a clock input terminal 136k connected to the monostable multivibrator 132. An auxiliary adder 138 is also provided having a first signal input terminal connected to the commonly connected outputs of the transfer gates 102, 104 and 106, a second signal input terminal connected to the output terminal of the data memory 134, and a clock input terminal 138k connected to the monostable multivibrator 132. When clock pulses are supplied to the clock input terminals 136k and 138k of the adders 136 and 138, signals received from the first and second signal input terminals 136k and 138k thereof are added. The adders 136 and 138 store and produce added results.

The temperature detection signal Sd from the temperature transducer 58 is further supplied to one input terminal of each of the comparators 140, 141, 142 and 143. The adder 136 is connected to the other input terminal of the comparator 143, whereas the adder 138 is connected to the other input terminal of the comparator 142. When the level of the temperature detection signal Sd is higher than that of the other input signals, the comparators 140, 141 and 143 produce logic level "1" signals. Otherwise, they produce logic level "0" signals. When the level of the output from the auxiliary adder 138 is higher than that of the temperature detection signal Sd, the comparator 142 produces a logic level "1" signal. Otherwise, the comparator 142 produces a logic level "0" signal. A data memory 144 prestores temperature data D144 which indicates a lower limit kettle temperature T144 (e.g., 90° C.) and supplies the temperature data D144 to the other input terminal of the comparator 140. Similarly, a data memory 146 prestores temperature data D146 which indicates an upper limit kettle temperature T146 (e.g., 110° C.) and supplies the temperature data D146 to the other input terminal of the comparator 141.

The output signal from the R-S flip-flop 130 included in the data processing section 112 is supplied to one input terminal of an AND gate 152 through an inverter 150, to an OR gate 154, to a third input terminal of a 3-input AND gate 156, and to an AND gate 158 having one input terminal connected to the comparator 143. The output terminal of the AND gate 152 has its the other input terminal connected to the comparator 141 and is connected to the set terminal 160s of an R-S flip-flop 160. The reset terminal 160r of the R-S flip-flop 160 is connected to the cooking switch 42. The output terminal of the flip-flop 160 is connected to the OR gate 154, to the first input terminal of a 3-input AND gate 164 through an inverter 162, to an AND gate 168 through an inverter 166, and to the first input terminal of a 3-input OR gate 170. The 3-input AND gate 164 has a second input terminal connected to the comparator 140 and the third input terminal connected to the output terminal of the comparator 141 through an inverter 172. The output terminal of the 3-input AND gate 164 is connected to the transfer gate 110. The OR gate 154 is connected to the clock input terminal 54k of the pulse counter 54 through the AND gate 52 which receives the clock pulse signal Pc. The output terminal of the pulse counter 54 is connected to a comparator 178, which is itself connected to a data memory 176 comprised of a ROM or the like. The data memory 176 prestores time data D176 which indicates a predetermined timer time t176 (e.g., 15 minutes in the embodiment shown in FIG. 2). When the time data D176 is greater than the count produced from the pulse counter 54, the comparator 178 produces a logic level "1" signal. Otherwise, the comparator 178 produces a logic level "0" signal in a known manner. The output from the comparator 178 is supplied to a first terminal of the 3-input AND gate 156 and to the AND gate 168 connected to the display driver 38.

The output terminal of the 3-input AND gate 156 is connected to the set terminal 182s of an R-S flip-flop 182 through an OR gate 180 which is connected to the cooking switch 42 via the line L1. The R-S flip-flop 182 has a reset terminal 182r which is connected to the output terminal of the 3-input OR gate 170 which has its second input terminal connected to the output terminal of the comparator 178 through an inverter 184 and its third input terminal connected to the output terminal of the AND gate 158. The output terminal of the R-S flip-flop 182 is connected to the aforementioned switch driver 36.

The mode of operation of the electric rice cooker according to one embodiment of the present invention will be described with reference to FIG. 3, which shows a graph for explaining changes in kettle temperature as a function of time. A proper amount of water is added to a predetermined amount of rice contained in the kettle 18 shown in FIG. 1. Thereafter, the lid member 16 is closed. In this condition, when the operator or user presses the cooking switch 42, the cooking switch 42 generates a logic level "1" signal. In response to this signal, the pulse counters 54 and 62 are reset and produce logic level "0" signals from their respective output terminals. The logic level "1" signal from the cooking switch 42 is supplied to the R-S flip-flop 182 through the OR gate 180. The R-S flip-flop 182 is thus set and supplies a logic level "1" signal to the switch driver 36, so that the switch driver 36 causes the normally-open switch or cooking heater switch 32 to close. An AC current from the AC power source 34 flows in the cooking heater 20 through the cooking heater switch 32. As a result, the cooking mode is initiated, in which the kettle 18 is heated by the heater 20.

In this state, one input terminal of the comparator 178 receives the time data D176 which indicates the predetermined timer time t176 and is read out from the data memory 176. At the same time, the other input terminal of the comparator 178 receives the logic level "0" signal (initial value) from the pulse counter 54. Therefore, the comparator 178 supplies a logic level "1" signal to one input terminal of the AND gate 168. The logic level "1" signal which is produced by the R-S flip-flop 160 is inverted by the inverter 166 and the inverted signal is supplied to the other input terminal of the AND gate 168. Therefore, since the AND gate 168 produces a logic level "1" signal, the indicator lamp 40 goes on upon energization of the display driver 38. The operator knows from the indicator lamp 40 that the cooking mode has been initiated.

The temperature of the kettle 18 containing rice and water and heated by the cooking heater 20 upon initiation of the cooking mode is increased as shown in FIG. 3. In accordance with the output from the thermistor 24, which constantly detects the kettle temperature, the digitized temperature detection signal Sd is produced at the same interval as the clock pulse signal Pc, that is, 1 sec. The cooking amount measuring section 50 is operated in response to the clock pulse signal Pc. In the cooking amount measuring section 50, the comparator 64 produces a logic level "0" signal until the level of the temperature detection signal Sd received by one input terminal of the comparator 64 is higher than that of the temperature data D68 which is read out from the data memory 68 and received by the other input terminal of the comparator 64, that is, until time t1 as shown in FIG. 3. After the time interval from 0 to t1 has elapsed, the comparator 64 produces a logic level "1" signal. The comparator 66 produces the logic level "1" signal until the level of the temperature detection signal Sd it receives is higher than the received temperature data D70 read out from the data memory 70, that is, until the time interval to t2 in FIG. 3 has elapsed. After time t2, the comparator 66 produces a logic level "0" signal. Therefore, the comparators 64 and 66 both produce logic level "1" signals during the time interval between time t1 and time t2. These signals are supplied to the input terminals of the 3-input AND gate 60. During the time interval between t1 and t2, the clock pulse signal Pc from the pulse generator 44 passes through the 3-input AND gate 60 and is supplied to the clock input terminal 62k of the pulse counter 62. Count C62 of the pulse counter 62 corresponds to the actual time interval (between time t1 and time t2) required to increase the temperature of the kettle 18 from the preset measuring temperature T68 indicated by the temperature data D68 from the data memory 68 to the preset measuring temperature T70 indicated by the temperature data D70 from the data memory 70. The count data C62 is thus proportional to the amount of kettle contents or cooking amount, so that the amount to be cooked can be determined from the corresponding count data C62. The count data C62 of the pulse counter 62 is supplied to the comparators 72 and 74 and is compared with the measured time data D76 and D78, respectively, indicating the preset time windows t76 and t78 (t76 < t78) read out from the data memories 76 and 78, respectively. When the count data C62 is smaller than the time window t76 which is indicated by the measuring time data D76, that is, when the cooking amount (quantity of rice to be cooked) is relatively small, the comparator 72 produces a logic level "0" signal. This signal is inverted by the inverter 108, and the inverted signal is transmitted to the line L4. However, when the count data C62 is greater than the time window t78 which is indicated by the measuring time data D78, that is, when the cooking amount is relatively large, the comparator 74 produces a logic level "1" signal. This signal is transmitted to the line L6. However, when the count C62 of the pulse counter 62 falls between the measuring time windows t76 and t78, that is, when there is a medium amount to be cooked, the comparator 72 generates a logic level "1" signal which is supplied to one input terminal of the AND gate 80, while the comparator 74 produces a logic level "0" signal which is inverted by the inverter 82 and then supplied to the other input terminal of the AND gate 80. Thus, the AND gate 80 produces a logic level "1" signal which is then supplied to the line L3. In the manner as described above, the cooking amount measuring section 50 determines the cooking amount in accordance with the actual time required to heat the kettle 18 from the measuring temperature T68 to the measuring temperature T70. The lines L4, L5 and L6 are connected to the transfer gates 96, 98 and 100, respectively, so that the transfer gates 96 and 102 are opened to allow temperature data D84 and D90, respectively indicating the predetermined measuring temperature T84 and the predetermined second cooking temperature T90, to pass therethrough when the cooking amount is relatively small. When there is a medium cooking amount, the transfer gates 98 and 104 are opened to allow data D86 and D92, which are read out from the data memories 86 and 92 and indicate the predetermined measuring temperature T86 and the predetermined second cooking temperature T92, respectively, to pass therethrough. When the cooking amount is relatively large, the transfer gates 100 and 106 are opened to allow the data D88 and D94, which are read out from the data memories 88 and 94 and indicate the predetermined measuring temperature T88 and the predetermined second cooking temperature T94, respectively, to pass therethrough.

Thereafter, when the kettle 18 is heated and the temperature detection signal Sd becomes greater than the lower limit kettle temperature T144, data for which is prestored in the data memory 144, the comparator 140, which receives the temperature detection signal Sd and the lower limit kettle temperature T144, becomes high. When the kettle 18 is further heated and the temperature detection signal Sd is greater than the upper limit kettle temperature T146, data for which is prestored in the data memory 146, the comparator 142 becomes high. At this time, the first input terminal of the 3-input AND gate 164 directly receives the output from the comparator 140, the second input terminal thereof receives a signal produced from the comparator 141 and inverted by the inverter 172, and the third input terminal thereof receives the output produced from the R-S flip-flop 160 and inverted by the inverter 162. At this time, since the R-S flip-flop 160 produces a logic level "0" signal, the input signals of the 3-input AND gate 164 are kept high when the comparator 140 produces a logic level "1" signal and the comparator 141 produces a logic level "0" signal. In fact, while the temperature of the kettle 18 is between the lower kettle temperature T144 and the higher kettle temperature T146, the AND gate 164 generates a logic level "1" signal which is supplied to the gate terminal of the transfer gate 110.

When the kettle temperature exceeds the lower limit kettle temperature T144, the transfer gate 110 allows the clock pulse signal Pc to pass therethrough, and the data processing section 112 is then operated. In the data processing section 112, the shift register 114 allows an updated temperature detection signal Sd, which is received at its input terminal, to pass each time a clock pulse signal Pc is supplied to the shift register 114, thereby sequentially producing updated temperature detection signals Sd1, each of which represents the temperature one second before the present time. The shift register 116 transfers the temperature detection signal Sd1 to its output terminal every time it receives the clock pulse signal Pc and sequentially produces a temperature detection signal Sd2 which represents the temperature two seconds before the present time. Similarly, the shift register 118 sequentially produces a temperature detection signal Sd3 which represents the temperature three seconds before the present time. The subtractor 124 subtracts the temperature detection signal Sd3 from the temperature detection signal Sd2 and supplies a subtracted result (indicating a temperature gradient of the kettle 18 over a one second interval from a time three seconds before the present time) to the comparator 126. The subtractor 122 subtracts the temperature detection signal Sd2 from the temperature detection signal Sd1 and supplies a subtracted result (indicating the temperature gradient of the kettle 18 over a one second interval from a time which is two seconds before the present time) to the comparator 126. When the subtracted result of the subtractor 124 becomes greater than the subtracted result of the subtractor 122, that is, when the temperature gradient or rise becomes steep at time t3 (FIG. 3) when no water is left at the bottom of the kettle 18, the comparator 126 supplies a logic level "1" signal to one input terminal of the AND gate 128. When the clock pulse signal Pc passing through the transfer gate 110 is supplied to the other input terminal of the AND gate 128 through the delay circuit 120, the R-S flip-flop 130 is set in response to the logic level "1" signal from the AND gate 128. The monostable multivibrator 132 is then triggered to supply a pulse to the data memory 134. In response to the pulse from the monostable multivibrator 132, the data memory 134 stores the temperature detection signal Sd2 as steep temperature rise data Ds. At the same time, when the adder 136 and the auxiliary adder 138 receive the pulse from the monostable multivibrator 132, the adder 136 adds together the steep temperature rise data Ds and the pulse supplied at both input terminals thereof. Similarly, the auxiliary adder 138 adds the steep temperature rise data Ds and the pulse supplied at both input terminals thereof. Sum data U136 and U138, respectively indicating temperature sums T136 and T138, are stored in the adders 136 and 138, and are also produced from the adders 136 and 138, respectively. At this time, appropriate temperature data among predetermined temperature data D84, D86 and D88 stored in the data memories 84, 86 and 88, respectively, is supplied to the other input terminal of the adder 136, according to the amount measured by the cooking amount measuring section 50. Appropriate second cooking mode temperature data among predetermined second cooking mode temperature data D90, D92 and D94 which are respectively stored in the data memories 90, 92 and 94 is supplied to one input terminal of the auxiliary adder 138, according to the amount measured by the cooking amount measuring section 50. Furthermore, when the R-S flip-flop 130 is set at time t3, the logic level "1" signal from the output terminal thereof is supplied to one input terminal of the AND gate 52 through the OR gate 166. Thus, the AND gate 52 allows the clock pulse signal Pc supplied to the other input terminal thereof to pass, and the pulse counter 54 starts counting the pulses. As a result, the timer 190 comprising the pulse counter 54, the comparator 178 and the data memory 176 starts counting from time t3.

The temperature sum T136 from the adder 136 is compared with the temperature detection signal Sd by the comparator 143. When the temperature detection signal Sd becomes greater than the temperature sum T136 at time t4, the comparator 143 supplies a logic level "1" signal to one input terminal of the AND gate 158. At this time, since the logic level "1" signal from the R-S flip-flop 130 is supplied to the other input terminal of the AND gate 158, the AND gate 158 produces a logic level "1" signal which is then supplied to the reset input terminal of the R-S flip-flop 182 through the OR gate 170. Therefore, the R-S flip-flop 182 is reset to stop supplying the logic level "1" signal to the switch driver 36. Thus, the cooking heater switch 32 is turned OFF, and the cooking heater 20 is deenergized. The steam mode is then initiated in which the operation is controlled by the timer 190. A "twice cooking" is then operated in accordance with the temperature sum T138 from the auxiliary adder 138. The temperature sum T138 of the auxiliary adder 138 is compared with the temperature detection signal Sd by the comparator 142. Following deenergization of the cooking heater 20, the kettle temperature gradually decreases until a time t5 when the temperature detection signal Sd becomes equal to the temperature sum T138. At this time, a logic level "1" signal is supplied from the comparator 142 to the third input terminal of the 3-input AND gate 156. Since the logic level "1" from the comparator 178 and the R-S flip-flop 130 are supplied to the first and second input terminals of the AND gate 156 respectively, the AND gate 156 produces a logic level "1" signal which is then supplied to the set input terminal 182s of the R-S flip-flop 182 through the OR gate 180. Therefore, the R-S flip-flop 182 is set to again drive the switch driver 36. The cooking heater switch 32 is turned ON again and the cooking heater 20 is then energized. The kettle 18 is heated again, thus performing the twice cooking mode. Thereafter, when the kettle temperature has been increased during the twice cooking mode such that the temperature detection signal Sd again exceeds the temperature sum T136 of the adder 136, the heater 20 is again deenergized. When the temperature detection signal Sd becomes equal to the temperature sum T138 of the auxiliary adder 138, the heater 20 is energized once again. The above sequence of operations is repeated, until fifteen minutes have elapsed from time t3 to t6, at which time the count of the counter 54 becomes equal to the predetermined timer time t176 whose data is stored in the data memory 176. The comparator 178 then produces a logic level "0" signal. This signal is inverted by the inverter 184 and the inverted signal is supplied to the set input terminal of the R-S flip-flop 182 through the OR gate 170. Thus, the R-S flip-flop 182 is reset, so that the switch driver 36 causes the heater switch 32 to be turned OFF. The heater 20 is then deenergized. At the same time, the logic level "0" signal from the comparator 178 is supplied to the AND gate 168 which then becomes low. The lamp driver 38 causes the indicator lamp 40 to turn OFF.

According to the electric rice cooker which is arranged and operated as described above, the temperature Ts is detected by the data memory 134 of the data processing section 112 at the so-called "dried-up condition" in which water has been completely absorbed by the rice or evaporated, that is, at the time when the temporarily flat curve of temperature change (saturated state) becomes steep at time t3 as shown in the graph in FIG. 3. One of the predetermined temperatures T84, T86 and T88, which is selected in accordance with the actual amount of rice and water contained in the kettle 18, is added to the temperature Ts by the adder 136. Thus, the temperature sum T136 corresponds to the target temperature which is finally determined according to the amount of kettle contents. When the kettle temperature, which is constantly measured by the thermistor 24, exceeds the temperature sum T136 as the target temperature, the heater 20 is deenergized. The target temperature is not a fixed value, but a value determined by the temperature Ts measured for each separate cooking operation and the actual contents of the kettle. Therefore, the target temperature may not be adversely affected by an error due to an insufficient contact condition between the kettle 18 and the thermistor 24, ambient temperature, a change in characteristics of the thermistor 24, variations in mass-produced rice cookers, or a change in atmospheric pressure. The time at which the heater 20 is turned OFF can always be properly controlled for each cooking operation. Further, since the heating time of the cooking heater 20 can be properly controlled in each cooking operation regardless of the quantity of rice to be cooked in the electric rice cooker, the rice is neither burnt nor insufficiently cooked, thereby providing good, tasty rice.

Furthermore, unlike the conventional control system, in the present invention, the "twice cooking" mode is not simply controlled by time data. According to the present invention, heating of the cooking heater 20 in the "twice cooking" mode is controlled on the basis of the actually-measured temperature Ts at a change (steep temperature rise) in kettle temperature. Furthermore, the reenergization of the heater 20 in the "twice cooking" mode is adjusted in accordance with the actual quantity of kettle contents measured by the cooking amount measuring section 50. Therefore, the twice cooking operation is properly performed.

The data processing section 112 which measures the actual temperature Ts of the kettle 18 is disabled by the transfer gate 110 until the actual kettle temperature exceeds the lower limit kettle temperature T144. Therefore, neither a temperature change which is indicated by reference symbol A at the very beginning of cooking nor a temperature change which is indicated by reference symbol B at the time when heat is applied to the kettle 18 and transmitted to the kettle contents can be erroneously detected as a proper temperature Ts. Therefore, the electric rice cooker according to the present invention provides a highly reliable control function.

Even if the user erroneously presses the cooking switch 42 when the kettle 18 is empty, the rice cooker is properly protected in the following manner. When the kettle 18 is empty, the kettle temperature is abruptly increased as indicated by reference symbol C in FIG. 3. Therefore, the temperature Ts cannot be detected in this case. When the kettle 18 is abruptly heated, the level of the temperature detection signal Sd rapidly becomes higher than the upper limit kettle temperature T146, and the comparator 141 produces a logic level "1" signal. The AND gate 164 produces a logic level "0" signal to turn off the transfer gate 110. At the same time, the logic level "1" signal from the comparator 141 is supplied to the other input terminal of the AND gate 152. At the same time, the logic level "0" signal from the R-S flip-flop 130 is inverted by the inverter 150, and the inverted signal is supplied to the one input terminal of the AND gate 152. Therefore, the AND gate 152 produces a logic level "1" signal which is supplied to the reset input terminal 182r of the R-S flip-flop 182 through the OR gate 170. As a result, the switch driver 36 causes the cooking heater switch 32 to be turned OFF, so that the cooking heater 20 is deenergized. (At the same time, the logic level "1" signal from the AND gate 152 is inverted by the inverter 166 and the inverted signal is supplied to the AND gate 168, so that the indicator lamp 40 goes off.) In this manner, when the kettle temperature exceeds the upper limit kettle temperature T146, the heater 20 is immediately deenergized. Therefore, the electric rice cooker will not be damaged due to heating while the kettle 18 is empty.

Although the present invention has been shown and described with respect to one particular embodiment, nevertheless, various changes and modifications which are obvious to a person skilled in the art to which the invention pertains are deemed to lie within the spirit, scope and contemplation of the invention.

In the above embodiment, for example, the second cooking mode is performed by repeatedly energizing-/deenergizing the cooking heater 20 to heat the kettle 18. In this case, heating temperatures of the repeated operations in the second cooking mode may vary. Furthermore, after the steam mode is completed, a hotplate mode may be initiated.

What we claim is:

1. An apparatus for electrically cooking rice with an appropriate amount of water, comprising:
    (a) a cooking kettle containing the rice and water;
    (b) electrical heater means for heating said kettle;
    (c) thermal insulating frame means for supporting and enclosing said kettle and said heater means;
    (d) temperature measuring means for measuring an actual kettle temperature and producing a first electrical signal which indicates the actual kettle temperature;

(e) cooking amount measuring means for electrically detecting an actual amount of contents in said kettle every time a cooking operation is performed and for producing a second electrical signal which indicates the actual amount of the contents in said kettle; and (f) controlling means connected to said temperature measuring means and said cooking amount measuring means, for determining a reference temperature corresponding to a suitable cooking complete temperature of said kettle corresponding to the actual amount of contents of said kettle and a cooking condition in response to the second electrical signal every time the cooking operation is performed, and for deenergizing said heater means when the actual kettle temperature, which is indicated by the first electrical signal and which is increased upon heating by said heater means, is equal to the reference temperature to interrupt heating by said heater means.

2. The apparatus according to claim 1, wherein said cooking amount measuring means is connected to said temperature measuring means to electrically compute the rate of change in the actual kettle temperature, the actual kettle temperature being increased by said heater means in response to the first electrical signal, and to measure the actual amount of contents of said kettle in accordance with the rate of change in the actual kettle temperature in order to obtain the second electrical signal.

3. The apparatus according to claim 2, wherein said cooking amount measuring means stores data of a temperature range determined by a first temperature preselected to be higher than room temperature and a second temperature higher than the first temperature, and detects a time interval during which the actual kettle temperature, which is increased by said heater means, moves through the temperature range, thereby computing the rate of change in the actual kettle temperature during the time interval.

4. The apparatus according to claim 1, wherein said cooking amount measuring means comprises:
first memory means for storing data of a first temperature preselected to be higher than room temperature and data of a second temperature higher than the first temperature; and
counter means connected to said first memory means and said temperature measuring means, for counting a time interval during which the actual kettle temperature is increased from the first temperature to the second temperature, thereby producing count data corresponding to the time interval, said counter means starting the operation when the actual kettle temperature indicated by the first electrical signal is equal to the first temperature.

5. The apparatus according to claim 4, wherein said cooking amount measuring means further comprises measurement circuit means connected to said counter means, for storing time interval data indicating a plurality of predetermined time intervals, and for detecting whether the time interval measured and represented by the count data falls within a specific time interval among said plurality of predetermined time intervals to produce a cooking amount measuring signal which quantitatively indicates the amount of the kettle contents.

6. The apparatus according to claim 5, wherein said controlling means comprises:

first circuit means connected to said temperature measuring means, for electrically detecting a temperature rise in the actual kettle temperature after the actual kettle temperature, which is indicated by the first electrical signal and which is increased by heating by said heater means, reaches a substantially flat temperature level, and for producing a third electrical signal indicating the flat temperature level;

second circuit means connected to said measurement circuit means, for producing a fourth electrical signal indicating correction temperature data in accordance with the amount of kettle contents in response to the cooking amount measuring signal; and third circuit means connected to said first and second circuit means, for determining the reference temperature by adding the third and fourth electrical signals.

7. The apparatus according to claim 6, wherein said third circuit means includes:
adder circuit means connected to said first and second circuit means, for adding data of the flat temperature level and the correction temperature data which are respectively indicated by the third and fourth electrical signals, and producing an added result as data of the reference temperature; and
first comparator circuit means connected to said temperature measuring means and said adder circuit means, for comparing the actual kettle temperature and the reference temperature and producing a detection signal when the actual kettle temperature is equal to or higher than the reference temperature.

8. The apparatus according to claim 7, wherein said controlling means further comprises:
switching means connected to said heater means, for performing a switching operation, said heater means being adapted to be connected to an AC power source through said switching means; and
driver means connected to said switching means and said first comparator circuit means, for controlling said switching means in response to the detection signal, thereby deenergizing said heater means by cutting off power supplied from said AC power source.

9. The apparatus according to claim 8, wherein said controlling means further comprises fourth circuit means, for storing data of a third temperature preselected to be higher than the second temperature, and for disabling said first circuit means for a time interval in which the actual kettle temperature, which is indicated by the first electrical signal and which is increased by heating by said heater means, is lower than the third temperature.

10. The apparatus according to claim 9, wherein said fourth circuit means includes:
second memory means for storing the third temperature data;
second comparator circuit means connected to said second memory means and said temperature measuring means, for comparing the actual kettle temperature indicated by the first electrical signal and the third temperature to produce a first comparison signal when the actual kettle temperature is smaller than the third temperature and to produce a second comparison signal when the actual kettle temperature is equal to or higher than the third temperature; and gate means connected to said second comparator circuit means and said first circuit means, for preventing supply of a clock signal to said first circuit means when said gate means receives the first comparison signal and for supplying the clock signal to said first circuit means when said gate means receives the second comparison signal.

11. The apparatus according to claim 10, wherein said first circuit means includes:

fifth circuit means connected to said gate means and said temperature measuring means, for detecting the actual kettle temperature, which is indicated by the first electrical signal and which is increased by heating by said heater means, in synchronism with the clock signal supplied through said gate means every time a unit time interval defined by the clock signal has elapsed;

sixth circuit means connected to said fifth circuit means, for receiving data of a first kettle temperature detected at a first time which is a first time interval ahead of an arbitrary moment, the first time interval corresponding to an n (positive integer) multiple of unit time intervals, data of a second kettle temperature detected at a second time which is a second time interval ahead of the arbitrary moment, the second time interval corresponding to an (n−1) multiple of unit time intervals from the arbitrary moment, and data of a third kettle temperature detected at a third time which is a third time interval ahead of the arbitrary moment, the third time interval corresponding to an (n−2) multiple of unit time intervals from the arbitrary moment, for computing a first difference between the first and second kettle temperatures and a second difference between the second and third kettle temperatures, and for detecting whether the second difference exceeds the first difference by a predetermined level, and if so, generating a pulse signal; and seventh circuit means connected to said fourth and sixth circuit means, for determining the second kettle temperature at the second time to be the flat temperature level in response to the pulse signal, and for producing the third electrical signal.

12. The apparatus according to claim 11, wherein said sixth circuit means includes a plurality of shift registers which are connected in series with each other, and said seventh circuit means includes a data memory.

13. The apparatus according to claim 6, wherein said controlling means further comprises:

correction temperature data output circuit means connected to said measuring means, for producing a twice cooking correction temperature signal indicating the correction temperature data for a twice cooking mode in accordance with the amount of kettle contents in response to the cooking amount measuring signal;

twice cooking reference temperature determining means connected to said first circuit means and said correction temperature data output circuit means, for adding the twice cooking correction temperature mode data to data of the flat temperature level indicated by the first electrical signal and determining a twice cooking reference temperature; and power supplying means connected to said heater means, said first circuit means and said twice cooking reference temperature determining means, for supplying power again to said heater means at least once when the actual kettle temperature, which decreases upon deenergization of said heater means, is equal to the twice cooking reference temperature, thereby returning the cooked rice in said kettle to a cooking state.

14. An electric rice cooker comprising:

(a) a cooking kettle for containing rice and water;

(b) a removable lid member covering the top of said kettle;

(c) electric heater means provided adjacent to an outer bottom surface of said kettle, for heating said kettle and kettle contents;

(d) thermal insulating frame means for supporting and enclosing said kettle and said heater means;

(e) temperature measuring means for measuring an actual kettle temperature and producing a first electrical signal which indicates the actual kettle temperature;

(f) cooking amount measuring means for electrically detecting an actual amount of contents of said kettle every time a cooking operation is performed and for producing a second electrical signal in accordance with a detected amount of the contents of said kettle;

(g) first temperature data creating means connected to said cooking amount measuring means, for producing a third electrical signal indicating correction temperature data in accordance with the detected amount of kettle contents in response to the second electrical signal;

(h) second temperature data creating means connected to said temperature measuring means, for electrically detecting a temperature rise after the actual kettle temperature, which is indicated by the first electrical signal and which is increased by said heater means, temporarily reaches a flat temperature level on the basis of a dried-up phenomenon of rice cooking, and for producing a fourth electrical signal as reference temperature data which corresponds to the flat temperature level;

(i) data processing means connected to said first and second temperature data creating means, for adding the data respectively indicated by the third and fourth electrical signals, and for determining a target temperature corresponding to a proper final temperature of said kettle at an end of cooking in accordance with the detected amount of the kettle contents every time the cooking operation is performed; and (j) heater controlling means connected to said heater means, said temperature measuring means and said data processing means, for deenergizing said heater means to interrupt heating of said kettle when the actual kettle temperature, which is indicated by the first electrical signal and which is increased by heating by said heater means, is equal to the target temperature.

* * * * *